(12) United States Patent
Krishnaswamy et al.

(10) Patent No.: US 11,657,037 B2
(45) Date of Patent: *May 23, 2023

(54) QUERY EXECUTION AGAINST AN IN-MEMORY STANDBY DATABASE

(71) Applicant: Oracle International Corporation, Redwood Shores, CA (US)

(72) Inventors: Vasudha Krishnaswamy, Fremont, CA (US); Yunrui Li, Fremont, CA (US); Vivekanandhan Raja, Foster City, CA (US); Tirthankar Lahiri, Palo Alto, CA (US); Mahesh B. Girkar, Cupertino, CA (US); Sukhada Pendse, Foster City, CA (US); Kartik Kulkarni, Foster City, CA (US); Jing Zheng, Foster City, CA (US); Shruti Gautam, San Mateo, CA (US); Henry Chau, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1151 days.

This patent is subject to a terminal disclaimer.

(21) Appl. No.: 15/253,780

(22) Filed: Aug. 31, 2016

(65) Prior Publication Data

US 2017/0116252 A1 Apr. 27, 2017

Related U.S. Application Data

(60) Provisional application No. 62/245,443, filed on Oct. 23, 2015.

(51) Int. Cl.
*G06F 16/23* (2019.01)
*G06F 16/25* (2019.01)
*G06F 16/27* (2019.01)

(52) U.S. Cl.
CPC ...... *G06F 16/2379* (2019.01); *G06F 16/2322* (2019.01); *G06F 16/2365* (2019.01);
(Continued)

(58) Field of Classification Search
CPC .... G06F 16/221; G06F 16/27; G06F 16/2455; G06F 11/2058; G06F 16/2453;
(Continued)

(56) References Cited

U.S. PATENT DOCUMENTS 4,507,751 A 3/1985 Gawlick et al.
4,710,926 A 12/1987 Brown et al.
(Continued)

FOREIGN PATENT DOCUMENTS

EP 0 503 417 A2 9/1992
EP 050180 A 9/1992
(Continued)

OTHER PUBLICATIONS

Teschke, et al., "Concurrent Warehouse Maintenance Without Comprising Session Consistency", 1998, 10 pages.
(Continued)

*Primary Examiner* — Tamara T Kyle
*Assistant Examiner* — Berhanu Mitiku
(74) *Attorney, Agent, or Firm* — Hickman Becker Bingham Ledesma LLP

(57) ABSTRACT

Techniques related to query execution against an in-memory standby database are disclosed. A first database includes PF data stored on persistent storage in a persistent format. The first database is accessible to a first database server that converts the PF data to a mirror format to produce MF data that is stored within volatile memory. The first database server receives, from a second database server, one or more change records indicating one or more transactions performed against a second database. The one or more change
(Continued)

records are applied to the PF data, and a reference timestamp is advanced from a first to a second timestamp. The first database server invalidates any MF data that is changed by a subset of the one or more transactions that committed between the first and second timestamps.

18 Claims, 8 Drawing Sheets

(52) U.S. Cl.
CPC ............ *G06F 16/258* (2019.01); *G06F 16/27* (2019.01); *G06F 16/275* (2019.01)

(58) Field of Classification Search
CPC .. G06F 16/2329; G06F 16/2255; G06F 16/86; G06F 16/2282; G06F 16/245; G06F 16/258; G06F 16/958; G06F 16/24539; G06F 16/24542; G06F 16/252; G06F 16/237; G06F 16/275; G06F 16/2322; G06F 16/2365
See application file for complete search history.

(56) References Cited

U.S. PATENT DOCUMENTS

| | | |
|---|---|---|
| 4,782,325 A | 11/1988 | Jeppsson et al. |
| 4,945,474 A | 7/1990 | Elliott et al. |
| 5,095,421 A | 3/1992 | Freund |
| 5,146,571 A | 9/1992 | Logan |
| 5,182,752 A | 1/1993 | DeRoo et al. |
| 5,233,618 A | 8/1993 | Gilder et al. |
| 5,241,675 A | 8/1993 | Sheth et al. |
| 5,263,156 A | 11/1993 | Bowen et al. |
| 5,287,496 A | 2/1994 | Chen et al. |
| 5,327,556 A | 7/1994 | Mohan |
| 5,329,628 A | 7/1994 | Yomamoto et al. |
| 5,333,265 A | 7/1994 | Orimo et al. |
| 5,333,316 A | 7/1994 | Champagne et al. |
| 5,355,477 A | 10/1994 | Strickland et al. |
| 5,369,757 A | 11/1994 | Spiro et al. |
| 5,388,196 A | 2/1995 | Pajak et al. |
| 5,418,940 A | 5/1995 | Mohan |
| 5,423,037 A | 6/1995 | Hvasshovd |
| 5,454,102 A | 9/1995 | Tang et al. |
| 5,487,164 A | 1/1996 | Kirchhofer et al. |
| 5,553,279 A | 9/1996 | Goldring |
| 5,555,404 A | 9/1996 | Torbjørnsen et al. |
| 5,559,991 A | 9/1996 | Kanfi |
| 5,574,906 A | 11/1996 | Morris |
| 5,581,753 A | 12/1996 | Terry et al. |
| 5,581,754 A | 12/1996 | Terry et al. |
| 5,588,012 A | 12/1996 | Oizumi |
| 5,603,024 A | 2/1997 | Goldring |
| 5,613,113 A | 3/1997 | Goldring |
| 5,696,775 A | 12/1997 | Nemazie et al. |
| 5,717,893 A | 2/1998 | Mattson |
| 5,734,898 A | 3/1998 | He |
| 5,742,792 A | 4/1998 | Yanai et al. |
| 5,778,430 A | 7/1998 | Ish et al. |
| 5,805,799 A | 9/1998 | Fredrickson et al. |
| 5,806,076 A | 9/1998 | Ngai et al. |
| 5,870,758 A | 2/1999 | Bamford et al. |
| 5,870,759 A | 2/1999 | Bauer et al. |
| 5,870,763 A | 2/1999 | Lomet |
| 5,893,930 A | 4/1999 | Song |
| 5,924,096 A | 7/1999 | Draper et al. |
| 5,956,731 A | 9/1999 | Bamford et al. |
| 5,960,436 A | 9/1999 | Chang et al. |
| 5,974,427 A | 10/1999 | Reiter |
| 5,983,277 A | 11/1999 | Heile et al. |
| 5,991,771 A | 11/1999 | Falls et al. |
| 6,009,432 A | 12/1999 | Tarin |
| 6,009,542 A | 12/1999 | Koller et al. |
| 6,014,669 A | 1/2000 | Slaughter et al. |
| 6,026,406 A | 2/2000 | Huang et al. |
| 6,044,367 A | 3/2000 | Wolff |
| 6,067,550 A | 5/2000 | Lomet |
| 6,094,708 A | 7/2000 | Hilla et al. |
| 6,098,190 A | 8/2000 | Rust et al. |
| 6,151,607 A | 11/2000 | Lomet |
| 6,192,377 B1 | 2/2001 | Ganesh et al. |
| 6,226,650 B1 | 5/2001 | Mahajan |
| 6,272,500 B1 | 8/2001 | Sugita |
| 6,298,319 B1 | 10/2001 | Heile et al. |
| 6,298,425 B1 | 10/2001 | Whitaker et al. |
| 6,324,661 B1 | 11/2001 | Gerbault et al. |
| 6,353,835 B1 | 3/2002 | Lieuwen |
| 6,393,485 B1 | 5/2002 | Chao et al. |
| 6,438,724 B1 | 8/2002 | Cox et al. |
| 6,446,234 B1 | 9/2002 | Cox et al. |
| 6,449,623 B1 | 9/2002 | Bohannon et al. |
| 6,516,327 B1 | 2/2003 | Zondervan et al. |
| 6,523,032 B1 | 2/2003 | Sunkara |
| 6,535,869 B1 | 3/2003 | Housel, III |
| 6,560,743 B2 | 5/2003 | Plants |
| 6,574,717 B1 | 6/2003 | Ngai et al. |
| 6,691,139 B2 | 2/2004 | Ganesh et al. |
| 6,728,879 B1 | 4/2004 | Atkinson |
| 6,732,125 B1 | 5/2004 | Autrey et al. |
| 6,775,681 B1 | 8/2004 | Ballamkonda |
| 6,804,671 B1 | 10/2004 | Loaiza et al. |
| 6,839,751 B1 | 1/2005 | Dietz et al. |
| 6,886,084 B2 | 4/2005 | Kawashima et al. |
| 6,980,988 B1 | 12/2005 | Demers et al. |
| 7,003,694 B1 | 2/2006 | Anderson, Jr. |
| 7,024,656 B1 | 4/2006 | Ahad |
| 7,076,508 B2 | 7/2006 | Bourbonnais et al. |
| 7,136,970 B2 | 11/2006 | Yoshiya et al. |
| 7,149,769 B2 | 12/2006 | Lubbers et al. |
| 7,149,858 B1 | 12/2006 | Kiselev |
| 7,155,463 B1 | 12/2006 | Wang et al. |
| 7,222,136 B1 | 5/2007 | Brown et al. |
| 7,228,354 B2 | 6/2007 | Chambliss et al. |
| 7,237,027 B1 | 6/2007 | Raccah et al. |
| 7,246,275 B2 | 7/2007 | Therrien et al. |
| 7,257,689 B1 | 8/2007 | Baird |
| 7,287,034 B2 | 10/2007 | Wong et al. |
| 7,290,017 B1 | 10/2007 | Wang et al. |
| 7,370,068 B1 | 5/2008 | Pham et al. |
| 7,464,113 B1 | 12/2008 | Girkar et al. |
| 7,600,063 B2 | 10/2009 | Loaiza |
| 7,627,612 B2 | 12/2009 | Ahal et al. |
| 7,627,614 B2 | 12/2009 | Hu et al. |
| 7,636,538 B2 | 12/2009 | Okamoto et al. |
| 7,644,084 B2 | 1/2010 | Rapp |
| 7,734,580 B2 | 6/2010 | Lahiri et al. |
| 7,761,425 B1 | 7/2010 | Erickson et al. |
| 7,822,717 B2 | 10/2010 | Kappor et al. |
| 7,895,216 B2 | 2/2011 | Longshaw et al. |
| 7,966,293 B1 | 6/2011 | Owara et al. |
| 7,996,363 B2 | 8/2011 | Girkar et al. |
| 8,024,396 B2 | 9/2011 | Sedukhin |
| 8,286,182 B2 | 10/2012 | Chan |
| 8,364,648 B1 | 1/2013 | Sim-Tang |
| 8,433,684 B2 | 4/2013 | Munoz |
| 8,468,320 B1 | 6/2013 | Stringham |
| 8,473,953 B2 | 6/2013 | Bourbonnais |
| 8,478,718 B1 | 7/2013 | Ranade |
| 8,560,879 B1 | 10/2013 | Goel |
| 8,615,578 B2 | 12/2013 | Hu et al. |
| 8,694,733 B2 | 4/2014 | Krishnan et al. |
| 8,832,142 B2 | 9/2014 | Marwah et al. |
| 8,838,919 B2 | 9/2014 | Shi et al. |
| 8,856,484 B2 | 10/2014 | Ben-Tsion et al. |
| 8,868,492 B2 | 10/2014 | Garin et al. |
| 8,868,504 B2 | 10/2014 | Aranna et al. |
| 8,930,312 B1 | 1/2015 | Rath |
| 9,026,679 B1 | 5/2015 | Shmuylovich |
| 9,077,579 B1 | 7/2015 | Chu |
| 9,146,934 B2 | 9/2015 | Hu et al. |
| 9,244,996 B2 | 1/2016 | Bourbonnais |
| 2002/0049950 A1 | 4/2002 | Loaiza et al. |

(56) References Cited

U.S. PATENT DOCUMENTS

| | | |
|---|---|---|
| 2002/0091718 A1 | 7/2002 | Bohannon et al. |
| 2002/0112022 A1 | 8/2002 | Kazar et al. |
| 2002/0133508 A1 | 9/2002 | LaRue et al. |
| 2002/0143755 A1 | 10/2002 | Wynblatt et al. |
| 2002/0165724 A1 | 11/2002 | Blankesteijn |
| 2003/0046396 A1 | 3/2003 | Richter et al. |
| 2003/0061537 A1 | 3/2003 | Cha et al. |
| 2003/0126114 A1 | 7/2003 | Tedesco |
| 2003/0140050 A1 | 7/2003 | Li |
| 2003/0140288 A1 | 7/2003 | Loaiza et al. |
| 2003/0212660 A1 | 11/2003 | Kerwin |
| 2003/0217064 A1 | 11/2003 | Walters |
| 2003/0217071 A1 | 11/2003 | Kobayashi et al. |
| 2004/0003087 A1 | 1/2004 | Chambliss et al. |
| 2004/0062106 A1 | 4/2004 | Ramesh et al. |
| 2004/0193570 A1 | 9/2004 | Yaegar |
| 2004/0236746 A1* | 11/2004 | Lomet ............... G06F 16/2477 707/999.009 |
| 2004/0267809 A1 | 12/2004 | East et al. |
| 2005/0005083 A1 | 1/2005 | Ozdemir |
| 2005/0038831 A1 | 2/2005 | Souder et al. |
| 2005/0055380 A1 | 3/2005 | Thompson et al. |
| 2005/0120025 A1 | 6/2005 | Rodriguez et al. |
| 2005/0165798 A1 | 7/2005 | Cherkauer et al. |
| 2006/0004691 A1 | 1/2006 | Sifry |
| 2006/0015542 A1 | 1/2006 | Pommerenk |
| 2006/0047713 A1 | 3/2006 | Gornshtein |
| 2006/0064405 A1 | 3/2006 | Jiang et al. |
| 2006/0080646 A1 | 4/2006 | Aman |
| 2006/0129559 A1 | 6/2006 | Sankaran |
| 2006/0168585 A1 | 7/2006 | Grcevski |
| 2006/0173833 A1 | 8/2006 | Purcell et al. |
| 2006/0200497 A1 | 9/2006 | Hu et al. |
| 2006/0212481 A1 | 9/2006 | Stacey et al. |
| 2006/0212573 A1 | 9/2006 | Loaiza et al. |
| 2006/0224551 A1 | 10/2006 | Lariba-Pey |
| 2006/0242513 A1 | 10/2006 | Loaiza et al. |
| 2007/0038689 A1 | 2/2007 | Shinkai |
| 2007/0083505 A1 | 4/2007 | Ferrari et al. |
| 2007/0100912 A1 | 5/2007 | Pareek et al. |
| 2007/0156957 A1 | 7/2007 | McHardy et al. |
| 2007/0174292 A1 | 7/2007 | Li et al. |
| 2007/0198608 A1 | 8/2007 | Prahlad |
| 2007/0226277 A1 | 9/2007 | Holenstein et al. |
| 2007/0239680 A1 | 10/2007 | Oztekin et al. |
| 2007/0244918 A1 | 10/2007 | Lee et al. |
| 2008/0005112 A1 | 1/2008 | Shavit |
| 2008/0016074 A1 | 1/2008 | Ben-dyke et al. |
| 2008/0059492 A1 | 3/2008 | Tarin |
| 2008/0104283 A1 | 5/2008 | Shin et al. |
| 2008/0126846 A1 | 5/2008 | Vivian et al. |
| 2008/0147599 A1 | 6/2008 | Young-Lai |
| 2008/0177803 A1 | 7/2008 | Fineberg et al. |
| 2008/0222311 A1 | 9/2008 | Lee |
| 2008/0228835 A1 | 9/2008 | Lashley et al. |
| 2008/0244209 A1 | 10/2008 | Seelam et al. |
| 2008/0256143 A1 | 10/2008 | Reddy et al. |
| 2008/0256250 A1 | 10/2008 | Wakefield et al. |
| 2008/0281784 A1 | 11/2008 | Zane et al. |
| 2008/0281865 A1 | 11/2008 | Price et al. |
| 2009/0024384 A1 | 1/2009 | Kobayashi et al. |
| 2009/0034377 A1 | 2/2009 | English et al. |
| 2009/0063591 A1 | 3/2009 | Betten et al. |
| 2009/0119295 A1 | 5/2009 | Chou et al. |
| 2009/0182746 A1 | 7/2009 | Mittal et al. |
| 2009/0248756 A1 | 10/2009 | Akidau |
| 2009/0268903 A1 | 10/2009 | Bojinov et al. |
| 2009/0307290 A1 | 12/2009 | Barsness et al. |
| 2010/0036843 A1 | 2/2010 | MacNaughton et al. |
| 2010/0082646 A1 | 4/2010 | Meek et al. |
| 2010/0082648 A1 | 4/2010 | Potapov |
| 2010/0122026 A1 | 5/2010 | Umaamageswaran et al. |
| 2010/0145909 A1 | 6/2010 | Ngo |
| 2010/0211577 A1 | 8/2010 | Shimuzu et al. |
| 2010/0235335 A1 | 9/2010 | Heman et al. |
| 2010/0250549 A1 | 9/2010 | Muller et al. |
| 2010/0318495 A1 | 12/2010 | Yan et al. |
| 2010/0318570 A1 | 12/2010 | Narasinghanallur et al. |
| 2011/0004586 A1 | 1/2011 | Cherryholmes et al. |
| 2011/0029569 A1 | 2/2011 | Ganesh et al. |
| 2011/0060724 A1 | 3/2011 | Chan |
| 2011/0066791 A1 | 3/2011 | Goyal et al. |
| 2011/0087633 A1 | 4/2011 | Kreuder et al. |
| 2011/0087637 A1 | 4/2011 | Sundaram et al. |
| 2011/0099179 A1 | 4/2011 | Balebail |
| 2011/0138123 A1 | 6/2011 | Aditya et al. |
| 2011/0145207 A1 | 6/2011 | Agrawal et al. |
| 2011/0231362 A1 | 9/2011 | Attarde et al. |
| 2011/0238655 A1 | 9/2011 | Colrain et al. |
| 2011/0307450 A1 | 12/2011 | Hahn et al. |
| 2012/0054158 A1 | 3/2012 | Hu et al. |
| 2012/0054533 A1 | 3/2012 | Shi et al. |
| 2012/0054546 A1 | 3/2012 | Kampouris |
| 2012/0109926 A1 | 5/2012 | Novik et al. |
| 2012/0159099 A1 | 6/2012 | Lindamood |
| 2012/0173515 A1 | 7/2012 | Jeong et al. |
| 2012/0259809 A1* | 10/2012 | Hermann ............... G06F 16/254 707/600 |
| 2012/0278282 A1 | 11/2012 | Lu |
| 2012/0284228 A1 | 11/2012 | Ghosh |
| 2012/0323849 A1 | 12/2012 | Garin et al. |
| 2012/0323971 A1 | 12/2012 | Pasupuleti |
| 2013/0085742 A1 | 4/2013 | Baker et al. |
| 2013/0117237 A1 | 5/2013 | Thomsen et al. |
| 2013/0132674 A1 | 5/2013 | Sundrani |
| 2013/0198133 A1 | 8/2013 | Lee |
| 2013/0212068 A1 | 8/2013 | Talius et al. |
| 2014/0040218 A1 | 2/2014 | Kimura et al. |
| 2014/0059020 A1 | 2/2014 | Hu et al. |
| 2014/0067792 A1 | 3/2014 | Erdogan |
| 2014/0075493 A1 | 3/2014 | Krishnan et al. |
| 2014/0095452 A1 | 4/2014 | Lee et al. |
| 2014/0095530 A1 | 4/2014 | Lee et al. |
| 2014/0095546 A1 | 4/2014 | Kruglikov et al. |
| 2014/0164331 A1 | 6/2014 | Li et al. |
| 2014/0214754 A1 | 7/2014 | Li |
| 2014/0258241 A1 | 9/2014 | Chen |
| 2014/0279840 A1 | 9/2014 | Chan et al. |
| 2015/0032694 A1 | 1/2015 | Rajamani et al. |
| 2015/0088811 A1 | 3/2015 | Hase et al. |
| 2015/0088822 A1* | 3/2015 | Raja ............... G06F 16/275 707/625 |
| 2015/0088824 A1 | 3/2015 | Kamp et al. |
| 2015/0088830 A1 | 3/2015 | Kamp et al. |
| 2015/0088919 A1 | 3/2015 | Hunter |
| 2015/0088926 A1 | 3/2015 | Chavan et al. |
| 2015/0089125 A1 | 3/2015 | Mukherjee et al. |
| 2015/0089134 A1 | 3/2015 | Mukherjee et al. |
| 2015/0120659 A1 | 4/2015 | Srivastava et al. |
| 2015/0120780 A1 | 4/2015 | Jain |
| 2015/0254240 A1 | 9/2015 | Li et al. |
| 2015/0317183 A1 | 11/2015 | Little |
| 2016/0077750 A1 | 3/2016 | Erdmann |
| 2016/0179867 A1 | 6/2016 | Li et al. |
| 2016/0224660 A1 | 8/2016 | Munk |
| 2016/0292167 A1 | 10/2016 | Tran et al. |
| 2016/0314046 A1* | 10/2016 | Kumarasamy ...... G06F 11/1448 |
| 2017/0116298 A1 | 4/2017 | Ravipati |
| 2018/0074915 A1 | 3/2018 | Yang |
| 2018/0121511 A1 | 5/2018 | Li |
| 2018/0165324 A1 | 6/2018 | Krishnaswamy |
| 2018/0349458 A1 | 12/2018 | Guirguis |

FOREIGN PATENT DOCUMENTS

| | | |
|---|---|---|
| EP | 2 608 070 A1 | 6/2013 |
| GB | 1 332 631 A | 10/1973 |
| GB | 2505 185 A | 2/2014 |
| JP | 59-081940 | 5/1984 |
| JP | 02-189663 | 7/1990 |
| JP | 08-235032 | 9/1996 |
| JP | 10-040122 | 2/1998 |

(56) References Cited

FOREIGN PATENT DOCUMENTS

JP           10-240575       9/1998
WO     WO 2007/078444 A1    7/2007

OTHER PUBLICATIONS

Vassilakis et al., "Implementation of Transaction and Concurrency Control Support in a Temporal DBMS" Information Systems, vol. 23, No. 5, 1998, 16 pages.
Bober et al., "On Mixing Queries and Transactions Via Multiversion Locking", IEEE, 1992, 11 pages.
Mohan et al., "Efficient and Flexible Methods for Transient Versioning of Records to Avoid Locking by Reading-Only Transactions", XP000393583, IBM Almaden Research Center, Dated Feb. 6, 1992, 11 pages.
Rajeev Kumar et al., Oracle DBA, A Helping Hand, Container Database and Pluggable Database (CDB & PDB), retrieved from the internet on Dec. 4, 2013, 2 pages.
Preimesberger, Chris, "Oracle Profits Up, but Revenues Slip" Oracle, dated Sep. 20, 2012, 2 pages.
Oracle Help Center, "Database 2 Day + Data Replication and Integration Guide", 3 Accessing and Modifying Information in Multiple Databases, dated 2016, 14 pages.
Oracle Base, Multitenant: Create and Configure a Pluggable Database (PDB) In Oracle Database 12c Release 1 (12.1), dated Jan. 8, 2014, 16 pages.
Muhammad Anwar, "How to Install Oracle 12c Multitenant Pluggable Database", Dated Feb. 24, 2012, 27 pages.
Garcia-Molina et al., "Database System Implementation", dated Jan. 1, 2000, 84 pages.
Francisco Munoz et al., "Oracle Database 12c Backup and Recovery Survival Guide", dated Sep. 24, 2013, 8 pages.
Dominic Betts et al., "Developing Multi-Tenant Applications for the Cloud", 3rd Edition, Microsoft, 2012, 246 pages.
Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.
Anonymous: "Oracle-Base—Multitenant: Overview of Container Databases (CDB) and Pluggable Databases (PDB)", dated Mar. 3, 2014, 4 pages.
Anonymous, :An Oracle White Paper Oracle Database Appliance: Migration Strategies, dated Jun. 2012, 14 pages.
Shao et al., "Clotho: Decoupling Memory Page Layout from Storage Organization", Proceedings of the 30th VLDB Conference, Toronto, Canada, 2004, 12 pages.
Schaffner et al., "A Hybrid Row-Column OLTP Database Architecture for Operational Reporting", dated Aug. 24, 2008, 14 pages.
Ramamurthy, Ravishankar, "A Case for Fractured Mirrors" Proceedings of the 28th VLDB Conference, dated, 2002, 12 pages.
Phipps, Colin:, "Mapping Deflated Files", Internet Article, dated Jan. 6, 2013, http://zsync.moria.org.uk/paper/ch03s02.html, 3 pages.
Oracle Database Administrator's Guide, 11g Release 2 (11.2), Chapter 26, Feb. 2010, 54 pages. http://download.oracle.com/docs/cd/E11882_01/server.112/e10595.pdf.
Oracle Database Administrator's Guide, 10g Release 2 (10.2), Chapter 24, May 2006, 34 pages. http://download.oracle.com/docs/cd/B19306_01/server.102/b14231.pdf.
O'Neil, P., et al., "Multi-table joins through bitmapped join indices", Sigmod Record, ACM, New York, NY, US, vol. 24, No. 3, Sep. 1, 1995, pp. 8-11, ISSN: 0163-5808.
Nirmesh, Malviya, "Recovery Algorithms for In-Memory OLTP Databases", Master of Science Thesis, dated Jul. 1, 2012, 66 pages.
Loizos, M., et al., "Improving distributed join efficiency with extended bloom filter operations", Advanced Networking and Applications, 2007. AINA '07., 21st international Conf. IEEE, May 1, 2007.
Mackert, F. Lothar et al., "R* optimizer validation and performance evaluation for local queries" Sigmod Record, ACM, New York, NY, US., vol. 15, No. 2, Jun. 1, 1986, pp. 84-95, ISSN: 0163-5808.
IBM, "A Scheduling Algorithm For Processing Mutually Exclusive Workloads in a Multi-System Configuration", dated Aug. 19, 2002, IEEE, 3 pages.
Zhang Ho et al., "In-Memory Big Data Management and Processing: A Survery", IEEE Transactions on Knowledge and Data Engineering, vol. 27, No. 7, dated Jul. 31, 2015, 30 pages.
Vishal Sikka et al., "EfficientTransaction Processing in SAP Hana Database", Proceedings of the 2012, International Conference on Management of Data, dated Jan. 31, 2012, 12 pages.
Farber et al., "SAP HANA Database—Data Management for Modern Business Applications", SIGMOD Record, dated Dec. 2011, vol. 40, No. 4, 8 pages.
Khalid Sayood:, "Introduction to data Compression", Morgan Kaufmann Publisher, dated Dec. 1996, 4 pages.
Li, U.S. Appl. No. 14/578,093, filed Dec. 19, 2014, Notice of Allowance, dated Sep. 22, 2017.
U.S. Appl. No. 13/829,103, filed Mar. 14, 2013, Office Action, dated Oct. 22, 2014.
U.S. Appl. No. 13/829,103, filed Mar. 14, 2013, Office Action, dated Jul. 18, 2016.
U.S. Appl. No. 13/829,103, filed Mar. 14, 2013, Final Office Action, dated Jul. 16, 2015. Chan, U.S. Appl. No. 13/829,103, filed Mar. 14, 2013, Office Action, dated Jun. 26, 2017.
Chan, U.S. Appl. No. 13/829,103, filed Mar. 14, 2013, Office Action, dated Jan. 31, 2018.
Chan, U.S. Appl. No. 13/829,103, filed Mar. 14, 2013, Interview Summary, dated May 11, 2017.
Chan U.S. Appl. No. 13/829,103, filed Mar. 14, 2013, Office Action, dated Jan. 27, 2017.
Alapati, S., Backing Up Databases. In: Expert Oracle Database 11g Administration, Apress, dated 2009, pp. 1-70.
Antoni Cau, et al., "Specifying Fault Tolerance within Stark's Formalism," 1993, IEEE, pp. 392-401.
IBM Corp., "IBM OS/2 Extended Edition Configuration," Feb. 1990, IBM Technical Disclosure Bulletin, vol. 32, No. 9B, pp. 446-451.
Yang, U.S. Appl. No. 15/266,375, filed Sep. 15, 2016, Notice of Allowance, dated Apr. 11, 2019.
Macnicol, U.S. Appl. No. 15/331,599, filed Oct. 21, 2016, Office Action, dated Apr. 19, 2019.
Li, U.S. Appl. No. 15/399,525, filed Oct. 31, 2016, Office Action, dated May 2, 2019. Li, U.S. Appl. No. 15/339,525, filed Oct. 31, 2016, Office Action, dated May 2, 2019.
Oracle, "Oracle Data Guard", Concepts and Administration 12c Release 1 (12.1), dated Nov. 2015, 50 pages. Oracle, "Oracle Active Data Guard", Real-Time Protection and Availability, Oracle White Paper, dated Oct. 2015, 22 pages.
Oracle, "Maximum Availability Architecture", Oracle Best Practices for High Availability, dated Sep. 2011, 42 pages.
Macnicol, U.S. Appl. No. 15/331,599, filed Oct. 21, 2016, Interview Summary, dated Jul. 25, 2019.
Li, U.S. Appl. No. 15/339,525, filed Oct. 31, 2016, Interview Summary, dated Jul. 31, 2019.
Werner Vogels, "Eventually Consistent", CACM, dated Dec. 19, 2007, 4 pages.
V Sikka et al, Efficient Transaction Processing in SAP HANA Database: the End of a Column Store Myth, SIGMOD dated 2012, 11 pages.
Oracle® Flashback Technologies, http://www.oracle.com/technetwork/database/features/availability/flashback-overview-082751.html, last viewed on Dec. 5, 2019, 3 pages.
Oracle® TimesTen In-Memory Database and TimesTen Application-Tier Database Cache, www.oracle.com/technetwork/database/database-technologies/timesten/overview/index.html, viewed on Dec. 5, 2019, 1pg.
Oracle Help Center, Oracle® TimesTen Application-Tier Database Cache User's Guide: Read-only Cache Groups, http://stdoc.us.oracle.com/12/12102/TTCAC/define.htm#TTCAC211, viewed on Dec. 5, 2019, 10 pages.

(56) References Cited

OTHER PUBLICATIONS

Ma et al., On benchmarking online social media analytical queries. In First International Workshop on Graph Data Management Experiences and Systems (GRADES '13). ACM, Article, dated 2013, 7 pages.
Labrinidis et al., "Balancing Performance and Data Freshness in Web Database Servers", VLDB dated 2003, 12 pages.
Jeff Erickson, In-Memory Acceleration for the Real-Time Enterprise, http://www.oracle.com/us/corporate/features/database-in-memory-option/index.html, last viewed on Dec. 5, 2019, 4 pages.
Gary Marchionini, Exploratory Search: From Finding to Understanding. Communications. ACM 49, 4, dated Apr. 2006, pp. 41-46.
Yang, U.S. Appl. No. 15/266,375, filed Sep. 15, 2016, Office Action, dated Oct. 31, 2019.
Srivastava, U.S. Appl. No. 15/482,225, filed Apr. 7, 2017, Office Action, dated Sep. 3, 2019.
Krishnaswamy, U.S. Appl. No. 15/892,677, filed Feb. 9, 2018, Office Action, dated Oct. 17, 2019.
Guirguis, U.S. Appl. No. 15/610,171, filed May 31, 2017, Office Action, dated Sep. 12, 2019.
Macnicol, U.S. Appl. No. 15/331,599, filed Oct. 21, 2016, Notice of Allowance, dated Feb. 5, 2020.
Krishnaswamy, U.S. Appl. No. 15/892,677, filed Feb. 9, 2018, Notice of Allowance, dated Mar. 11, 2020.
Guirguis, U.S. Appl. No. 15/610,171, filed May 31, 2017, Notice of Allowance, dated Feb. 20, 2020.
U.S. Appl. No. 15/331,559, filed Oct. 21, 2016, Final Office Action, dated Oct. 3, 2019.
Zhe, Li, et al., "PERF join: an alternative to two-way semijoin and Bloomjoin" Proceedings of the 1995 ACM, New York. NY, US., 1995, pp. 187-144.
Oracle, "Oracle® TimesTen Application-Tier Database Cache", Users Guide, Release 18.1, Dated Nov. 2019, 230 pages.
Oracle Help Center, "TimesTen Application-Tier Database Cache Introduction", dated 2012, 10 pages.
Li, U.S. Appl. No. 15/399,525, filed Oct. 31, 2016, Notice of Allowance, dated Jun. 19, 2020.
Rajamani, U.S. Appl. No. 13/950,207, filed Jul. 24, 2013, Notice of Allowance, dated Jul. 14, 2017.

\* cited by examiner

QUERY EXECUTION AGAINST AN IN-MEMORY STANDBY DATABASE

BENEFIT CLAIM

This application claims the benefit of Provisional Appln. 62/245,443, filed Oct. 23, 2015, the entire contents of which is hereby incorporated by reference as if fully set forth herein, under 35 U.S.C. § 119(e).

FIELD OF THE DISCLOSURE

Embodiments relate to database systems and more specifically, to query execution against an in-memory standby database.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In case of data corruption or system failure at a primary database, a copy of the primary database may be maintained as a separate database known as a standby database. Thus, if the primary database fails, a failover to the standby database may be performed. Typically, the primary database and the standby database are maintained in separate database systems that are remotely connected. For example, FIG. 1 depicts multiple database systems that are communicatively coupled. Referring to FIG. 1, first database system 100 maintains first database 108, and second database system 114 maintains second database 124. In some example embodiments, first database 108 and second database 124 correspond to the standby database and the primary database, respectively.

First database system 100 and second database system 114 may each correspond to any of a number of different types of database systems, such as a clustered database system and/or a multi-tenant database system. In the example of FIG. 1, first database system 100 includes first database server computing device 102 and first persistent storage 112. Second database system 114 includes second database server computing devices 116A-N and second persistent storage 128. The label "N" in "116N," and in any other reference numeral herein, connotes that any number of elements, items, or sets of items may be present or used in embodiments, as in "1 to n items". Second database server computing devices 116A-N correspond to clustered nodes that each run one of instances 118A-N. Each instance of instances 118A-N is a collection of memory and processes that interact with second database 124. Whereas first database server computing device 102 runs a first database server, instances 118A-N collectively implement server-side functions of second database system 114. Second database server computing devices 116A-N may communicate with each other via an interconnect (not shown).

First database 108 and second database 124 may each reside in volatile and/or non-volatile storage, such as first volatile memory 104, second volatile memories 120A-N, first persistent storage 112, and second persistent storage 128. Thus, first database 108 and second database 124 may each include a virtual disk and/or a set of physical disks. Additionally or alternatively, first database 108 and second database 124 may each be stored, at least in part, in main memory of a database server computing device.

Maintaining Consistency Between Databases

Maintaining consistency between the primary database and the standby database involves replicating changes to the primary database on the standby database. FIG. 2 is a block diagram that depicts an approach for maintaining consistency between multiple databases. Referring to FIG. 2, primary database system 200 is communicatively coupled to standby database system 204. In some example embodiments, primary database system 200 corresponds to second database system 114, and standby database system 204 corresponds to first database system 100. Transaction(s) 202 implement one or more changes to the primary database. Primary database system 200 records the one or more changes in change records 206A-N, which are sent to standby database system 204 for replication. Example change records include redo records or redo information as described in U.S. patent application Ser. No. 11/818,975, filed Jan. 29, 2007; U.S. patent application Ser. No. 12/871,805, filed Aug. 30, 2010; U.S. patent application Ser. No. 13/161,315, filed Jun. 15, 2011; and U.S. patent application Ser. No. 14/337,179, filed Jul. 21, 2014, the entire contents of each of which are incorporated herein by reference.

Transaction(s) 202 implement one or more changes to a primary database based on one or more instructions that are processed as a single logical operation. For example, the Structured Query Language (SQL) commands "INSERT", "UPDATE", and "DELETE" may be multiple operations that are processed as a single transaction. Any changes implemented by a particular transaction are persisted when the particular transaction commits. Transaction(s) 202 that fail to commit may undergo a "rollback" operation that restores a previous version of data.

When one or more changes are implemented at a primary database, a current system change number (SCN) of the primary database may increase. A SCN represents a logical time that corresponds to a particular state of the primary database. For example, when a particular transaction begins, the current SCN of the primary database may be at "1". When the particular transaction makes a particular change, the current SCN may advance to "2". When the particular transaction commits, the current SCN may advance to "3".

As mentioned above, change records 206A-N specify one or more changes made by transaction(s) 202 performed against a primary database. Primary database system 200 may stream change records 206A-N to standby database system 204. When the primary database is a clustered database, such as second database system 114, each of instances 118A-N of the primary database may send, to standby database system 204, one or more of change records 206A-N. Standby database system 204 may merge change records 206A-N received from instances 118A-N and may sort change records 206A-N in an increasing SCN order.

In some example embodiments, change records 206A-N may include data block addresses 208A-N. A data block is an atomic unit of data that a database server may request to read from and write to a storage device that stores table data in, for example, a block-mode disk storage device. In order to retrieve a row from a storage device, a data block containing the row is read into a cache and the data block must be further examined to access the row. A data block may correspond to a predetermined number of bytes of physical storage space. For example, a cache may store data in data blocks that each correspond to two kilobytes of disk space. Each change record includes a data block address that may indicate a location of a particular data block in primary database system 200 and/or standby database system 204. The location may be a relative location of the particular data block at which a change occurred in the primary database. Since the standby database is a replica of the primary database, the location may also be a relative location of the particular data block at which a change is to occur in the standby database.

In some example embodiments, standby database system 204 includes parallel processes 210A-N that apply changes indicated in change records 206A-N to corresponding data blocks in the standby database. Standby database system 204 may allocate change records 206A-N among parallel processes 210A-N based on data block addresses 208A-N. For example, parallel process 210A may be allocated any change records to be applied in the data block address range of 100 to 500, and parallel process 210B may be allocated any change records to be applied in the data block address range of 501 to 700. In some example embodiments, change records 206A-N may be allocated among parallel processes 210A-N based on a hash of data block addresses 208A-N.

Executing Queries Against a Standby Database

Since the standby database maintains a copy of the primary database, the standby database is an excellent candidate for sharing some of the primary database's workload. For example, read-only queries may be executed against the standby database instead of the primary database so that the primary database is available for more transaction-oriented queries. However, the standby database typically lags behind the primary database, because the standby database replicates changes that are already implemented at primary database system 200. In other words, the standby database's state is continuously catching up to the primary database's state. For example, if the primary database's current SCN is at 100, the standby database's latest-readable SCN may be at 75, and if the primary database's current SCN advances to 120, the standby database's latest-readable SCN may advance to 100. Note that a difference in SCNs between the primary database's current SCN and the standby database's latest-readable SCN may not remain constant. This is because the standby database's latest-readable SCN depends on which change records have been applied to the standby database. In other words, the standby database's latest-readable SCN indicates a latest reference point as of which data in the standby database may be read by a query, because the data in the standby database is consistent with data in the primary database as of that reference point.

Thus, prior to executing a particular query against the standby database, standby database system 204 may determine whether executing the particular query against the primary database would yield a result that is consistent with executing the particular query against the standby database. FIG. 3 depicts an example request to execute a query. Referring to FIG. 3, standby database system 204 receives request 300 to execute query 302, which corresponds to query time 304 as of which query 302 is to be executed. Standby database system 204 may determine whether to retrieve data for query 302 based on comparing a reference timestamp to query time 304. In some example embodiments, the reference timestamp is the standby database's latest-readable SCN. If query time 304 is less than the reference timestamp, standby database system 204 retrieves data for query 302. Otherwise, standby database system 204 may delay executing query 302 until the reference timestamp becomes greater than or equal to query time 304. For example, query 302 may correspond to query time 304 of SCN 100, but the standby database's latest-readable SCN may only be 75. At this time, standby database system 204 may delay executing query 302. As change records 206A-N are applied to the standby database, the standby database's latest-readable SCN advances to 100. At this time, standby database system 204 can execute query 302.

In some example embodiments, the reference timestamp (e.g., query SCN) is a consensus timestamp of parallel processes 210A-N. FIG. 4 depicts an approach for determining a reference timestamp for parallel processes. Referring to FIG. 4, each of parallel processes 210A-N corresponds to a respective SCN that advances as one or more change records are applied to a particular data block address range. For example, parallel process 210A may be at SCN 120, parallel process 210B may be at SCN 100, and parallel process 210C may be at SCN 75. A consensus timestamp may be a minimum SCN value for parallel processes 210A-N. In the example of FIG. 4, new consensus timestamp 400 corresponds to parallel process 210C's SCN. As SCNs of parallel processes advance, so do consensus timestamps. In FIG. 4, old consensus timestamp 402 advances to become new consensus timestamp 400 when a lagging parallel process's SCN advances. For example, parallel process 210B's SCN may have advanced from SCN 50 to SCN 100, thereby enabling new consensus timestamp 400 to become equivalent to parallel process 210C's SCN of 75.

Maintaining MF Data at a Primary Database

As mentioned above, a database may reside in main memory and/or disk(s). Thus, a growing trend is to execute queries against main memory databases known as in-memory databases. Typically, all or part of a disk-based database is stored in main memory for relatively faster access to data. Additionally or alternatively, data may be stored in main memory in a different and independent format from data stored on disk(s). For example, data may be stored on disk(s) in a row-based format, whereas data may be stored in main memory in a column-based format. Hereinafter, a format in which data is stored on disk(s) is called a persistent format (PF), and a different format in which data is stored in main memory is called a mirror format (MF). Thus, PF data is stored in first persistent storage 112, second persistent storage 128, and/or a cache of persistent storage data. In contrast, MF data is stored in main memory separately from any cache of PF data. Advantageously, certain operations, such as vector processing, may be more efficiently performed on MF data as opposed to PF data.

Many primary databases maintain MF data for faster query execution. For example, second set of PF data 126 may be converted into second sets of MF data 122A-N using any of the techniques described in U.S. patent application Ser. No. 14/337,179, filed Jul. 21, 2014, the entire contents of which are incorporated herein by reference. However, as described above, a standby database operates differently from a primary database, because the standby database is designed to efficiently maintain consistency between first set of PF data 110 and second set of PF data 126. In other words, many of the techniques described in U.S. patent application Ser. No. 14/337,179 are inapplicable to a standby database environment.

Thus, there is a need for techniques adapted to converting first set of PF data 110 into first set of MF data 106 in a standby database environment.

Figure 1:
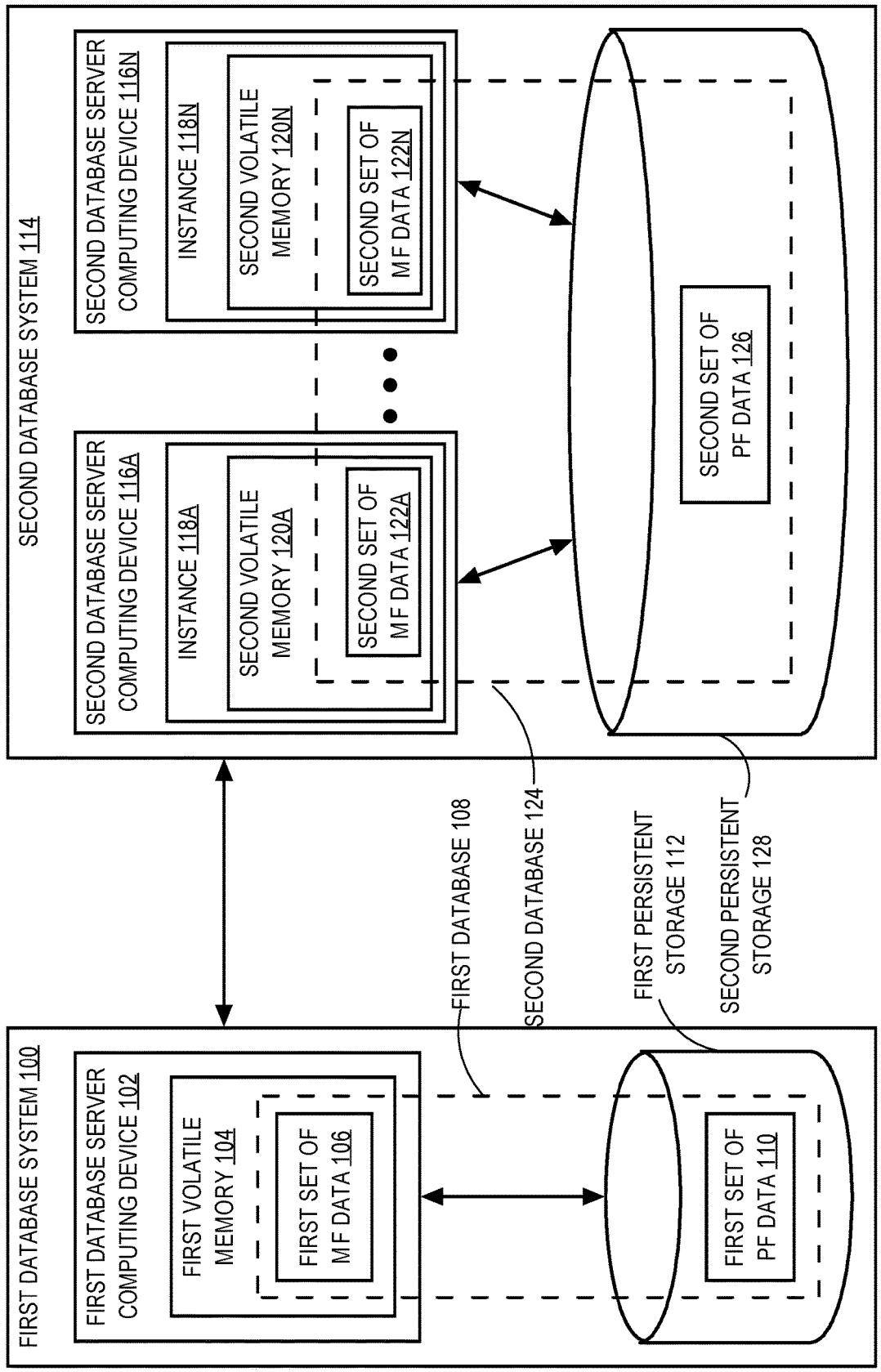
FIG. 1 depicts an example computer architecture on which embodiments may be implemented.
Figure 2:
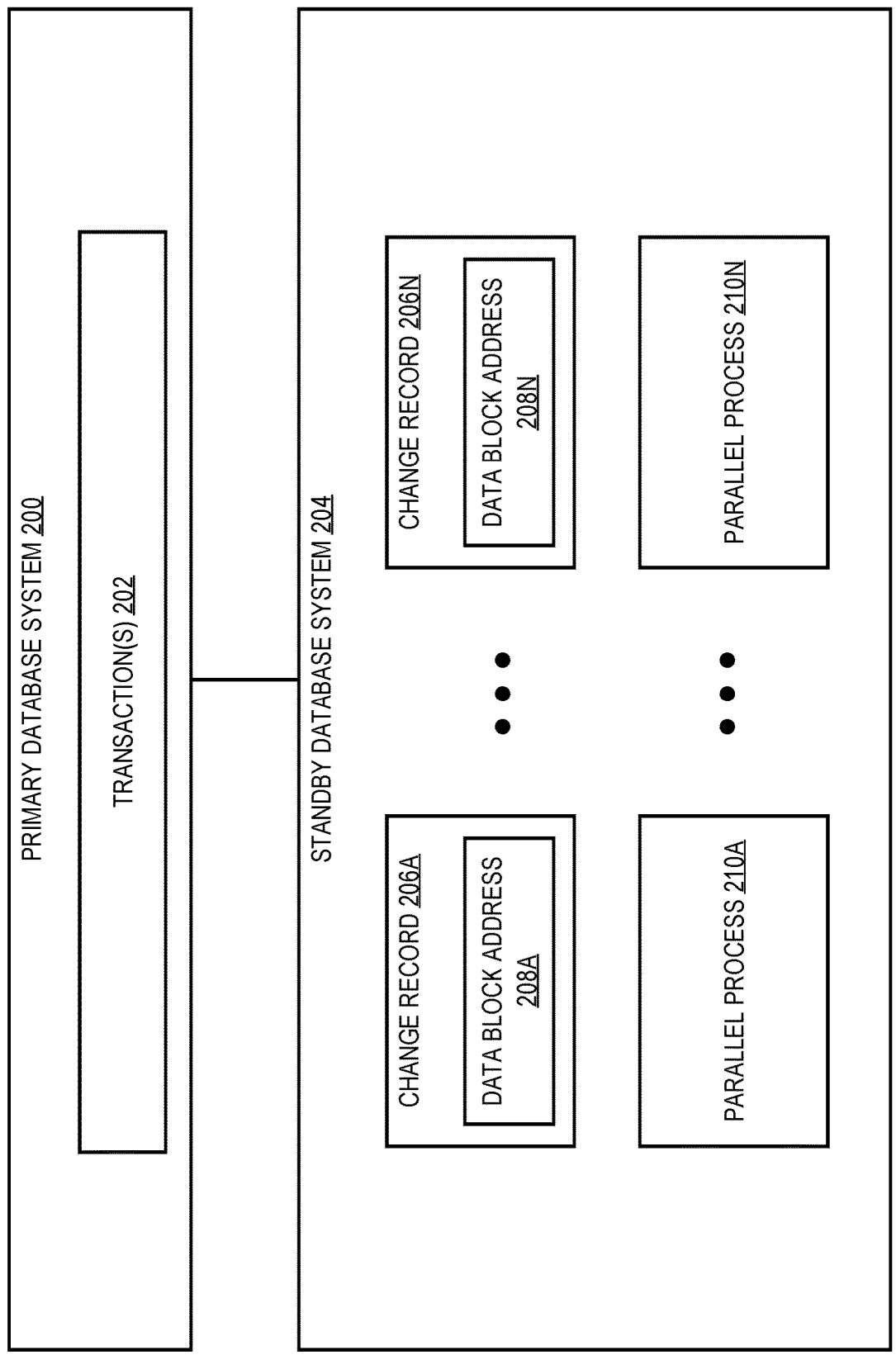
FIG. 2 is a block diagram that depicts an approach for maintaining consistency between multiple databases.
Figure 3:
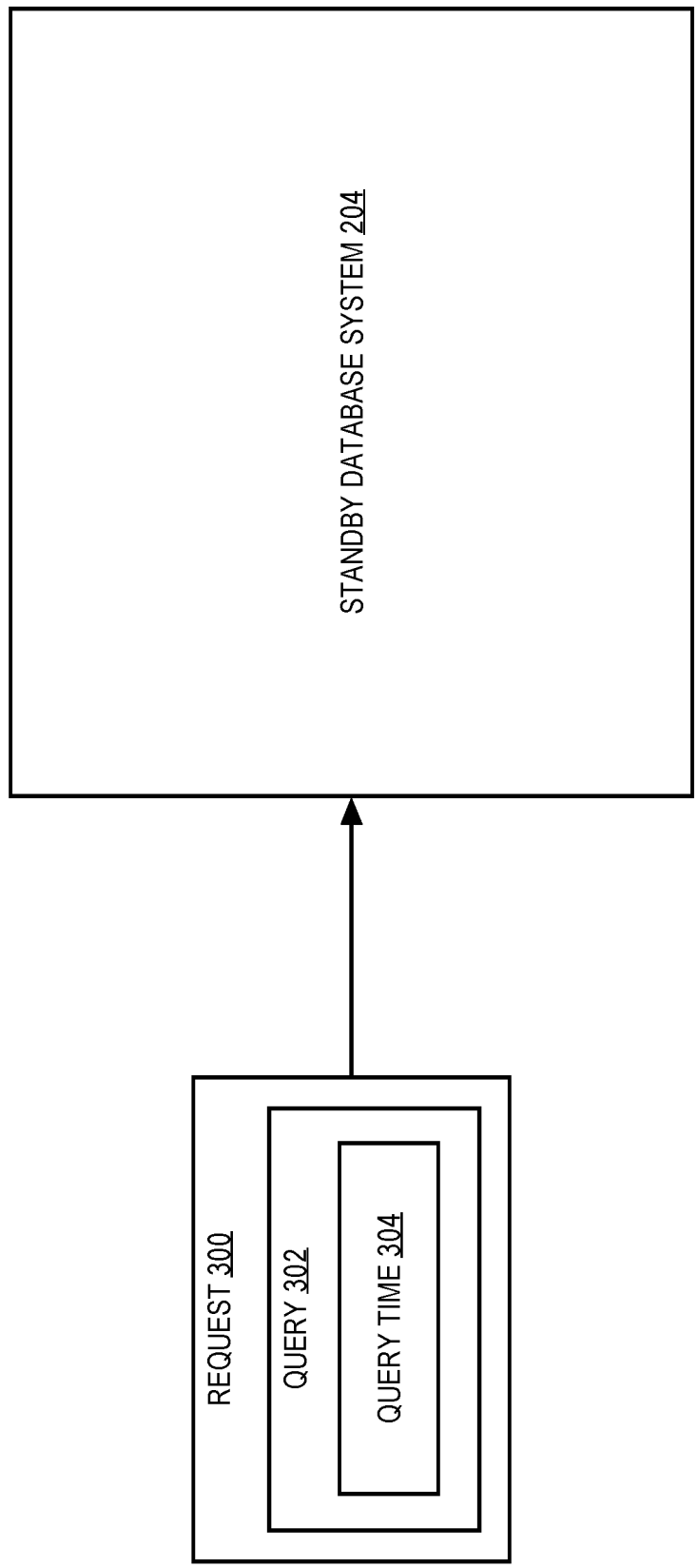
FIG. 3 depicts an example request to execute a query.
Figure 4:
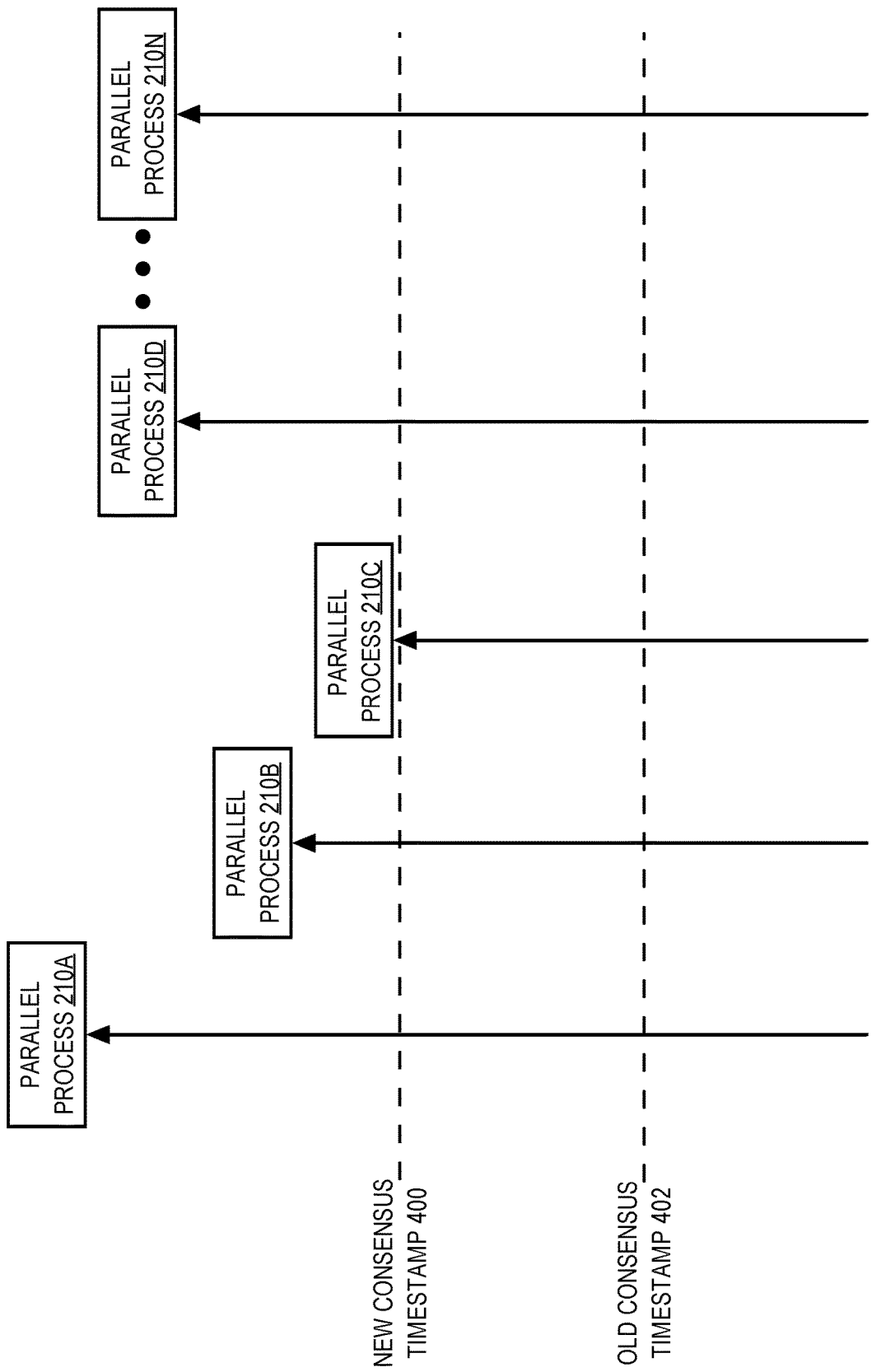
FIG. 4 depicts an approach for determining a reference timestamp for parallel processes.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order.

General Overview

A standby database system maintains PF data and MF data. The PF data is at least stored on persistent storage, such as disk(s). The MF data is converted from the PF data and stored in main memory. A primary database sends change records to the standby database, where one or more apply processes apply the change records to the PF data. If the change records indicate that changes may be made to the MF data, the one or more apply processes also record the changes in a transaction log. In some example embodiments, the one or more apply processes operate in parallel. However, the standby database system enables parallel processes to concurrently write in the transaction log based on apportioning chunks of memory to the parallel processes.

If any of the changes to the MF data correspond to a committed transaction, MF data blocks modified by the committed transaction are marked invalid in a bitmap. In some example embodiments, the standby database system performs bitmap invalidation when a reference timestamp advances. Thus, the standby database system may perform bitmap invalidation in a batch for multiple transactions that have committed since the previous reference timestamp.

When the standby database receives a query that is to be executed as of a particular query time, the standby database compares the reference timestamp to the particular query time. If the particular query time is less than the reference timestamp, the standby database retrieves data for the query. Whether the data retrieved is MF data and/or PF data depends on whether all or part of the data corresponds to an invalid data block. Valid data blocks may be read from MF data, whereas invalid data blocks are read from PF data.

Recording Changes to MF-Enabled Data

When standby database system 204 receives change records 206A-N from primary database system 200, a subset of change records 206A-N may include an indication that particular changes may affect MF data at standby database system 204. As used herein, a subset may be all or part of a set. For example, each change record may include a bit flag in header data indicating that a change occurred for "MF-enabled" data. Hereinafter, "MF-enabled data" refers to data that can be stored in mirror format.

Figure 5:
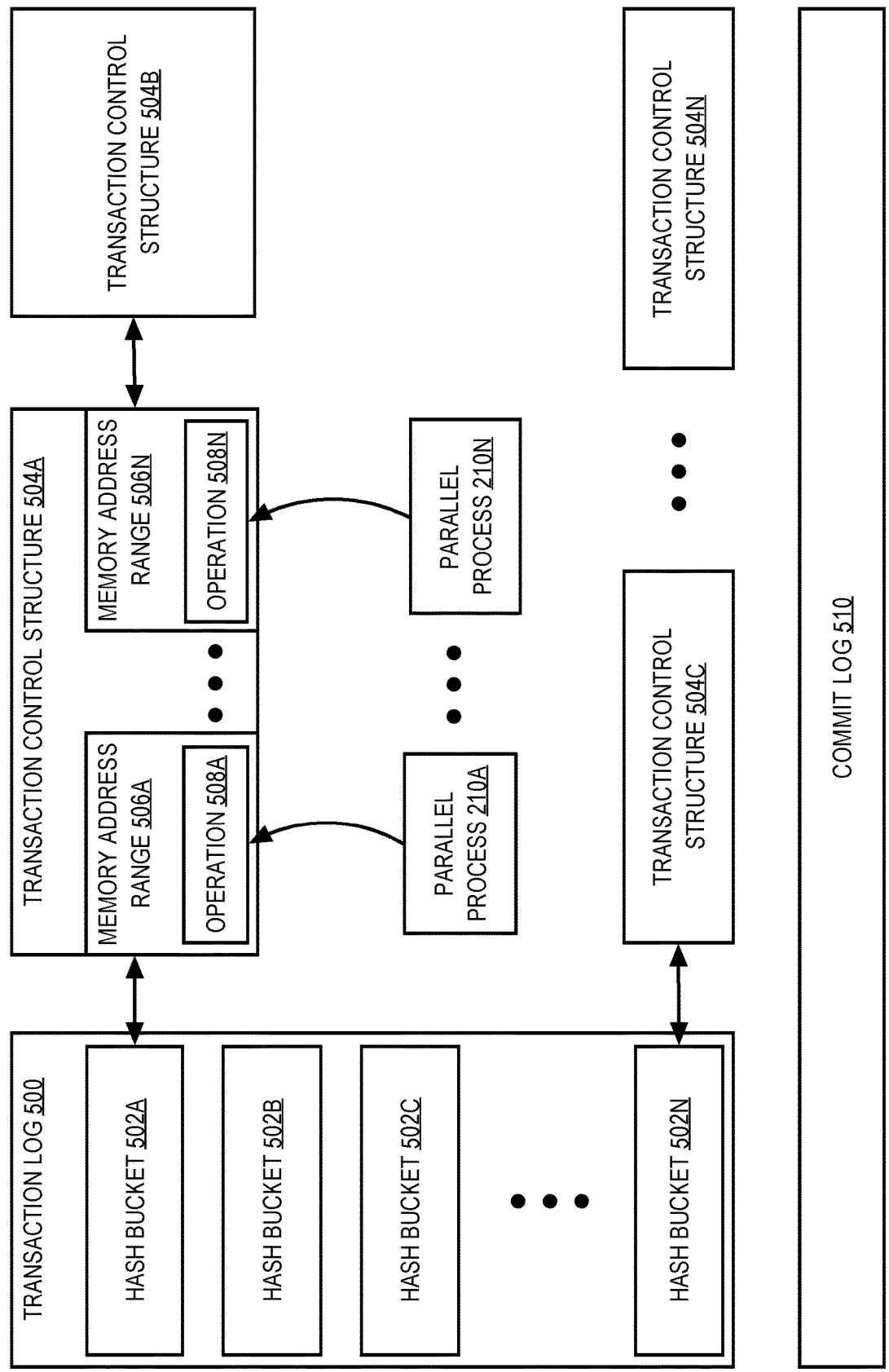
FIG. 5 is a block diagram that depicts an approach for recording changes to MF-enabled data.

Standby database system 204 maintains a separate record of changes to MF-enabled data. Referring to FIG. 5, this separate record may be transaction log 500. Transaction log 500 is a global record of changes that may affect MF data at standby database system 204. Thus, a master instance maintains transaction log 500 if standby database system 204 is a clustered database system.

From the subset of change records 206A-N, standby database system 204 extracts information that may include a transaction identifier, a data block address, a tenant database identifier, and/or any other context information. In some example embodiments, parallel processes 210A-N extract the information from the subset of change records 206A-N.

In the example of FIG. 5, transaction log 500 is organized according to a hash table that includes hash buckets 502A-N. Each hash bucket may correspond to a set of hashed transaction identifiers. Thus, standby database system 204 determines a corresponding hash bucket for a particular change based on hashing a transaction identifier for the particular change. In some example embodiments, parallel processes 210A-N determine corresponding hash buckets for a set of changes.

Each hash bucket corresponds to zero or more transaction control structures 504A-N. For example, off of hash bucket 502A, there may be a doubly linked list of transaction control structures 504A-B. Each transaction control structure corresponds to a separate transaction. Standby database system 204 creates a new transaction control structure for a previously unknown transaction upon applying the first change record that corresponds to the previously unknown transaction. For example, Transaction A may involve data manipulation language (DML) operations A-B. If standby database system 204 first encounters DML operation B and then encounters DML operation A, standby database system 204 creates a transaction control structure for Transaction A upon encountering DML operation B.

In some example embodiments, parallel processes 210A-N create new transaction control structures for separate transactions. To avoid multiple transaction control structures that each correspond to a single transaction, creation of transaction control structures 504A-N may be governed by a global lock. For example, if parallel process 210A and parallel process 210B simultaneously encounter DML operation A and DML operation B, respectively, but parallel process 210A first obtains the global lock, then parallel process 210A creates a transaction control structure for Transaction A.

Each transaction control structure is a container for information about a particular transaction. In the example of FIG. 5, standby database system 204 stores, in transaction control structure 504A, information about operations 508A-N that were involved in a particular transaction. Such information may include addresses of data blocks affected by operations 508A-N, a begin transaction marker that indicates when a particular transaction began, and an end transaction marker that indicates when a particular transaction ended or committed.

In some example embodiments, parallel processes 210A-N may store information about operations 508A-N in transaction control structure 504A. To avoid bottlenecked write access to transaction control structure 504A, memory address ranges 506A-N are allocated to parallel processes 210A-N. Each memory address range corresponds to a portion of transaction control structure 504A that is accessible to a single parallel process.

Operations 508A-N may include a commit operation. A transaction control structure that includes a commit operation corresponds to a committed transaction. Standby database system 204 may scan transaction control structures 504A-N for commit operations to determine which transactions have committed.

In some example embodiments, standby database system 204 may efficiently determine which transactions have committed based on maintaining commit log 510. Standby database system 204 may store information about committed transactions in commit log 510. Such information may include transaction identifiers and/or addresses of data blocks affected by operations involved in the committed transactions.

Invalidating MF Data

As mentioned above, standby database system 204 may periodically advance a reference timestamp, such as a query SCN, that indicates whether a query may be executed against a current state of a standby database. When the reference timestamp advances, standby database system 204 invalidates any MF data that was modified by a committed transaction. Invalid MF data is MF data that has become unreadable, because it has changed. Loading MF data into main memory involves at least as much computational overhead as retrieving corresponding PF data. Thus, standby database system 204 loads MF data into main memory on a periodic basis. Between loadings, standby database system 204 marks as unreadable any MF data that was changed by a committed transaction. As mentioned above, standby database system 204 may determine which transactions have committed based on traversing transaction log 500 or commit log 510. Since invalid MF data is unreadable, standby database system 204 instead reads PF data that corresponds to the invalid MF data, because PF data is continuously updated.

Figure 6:
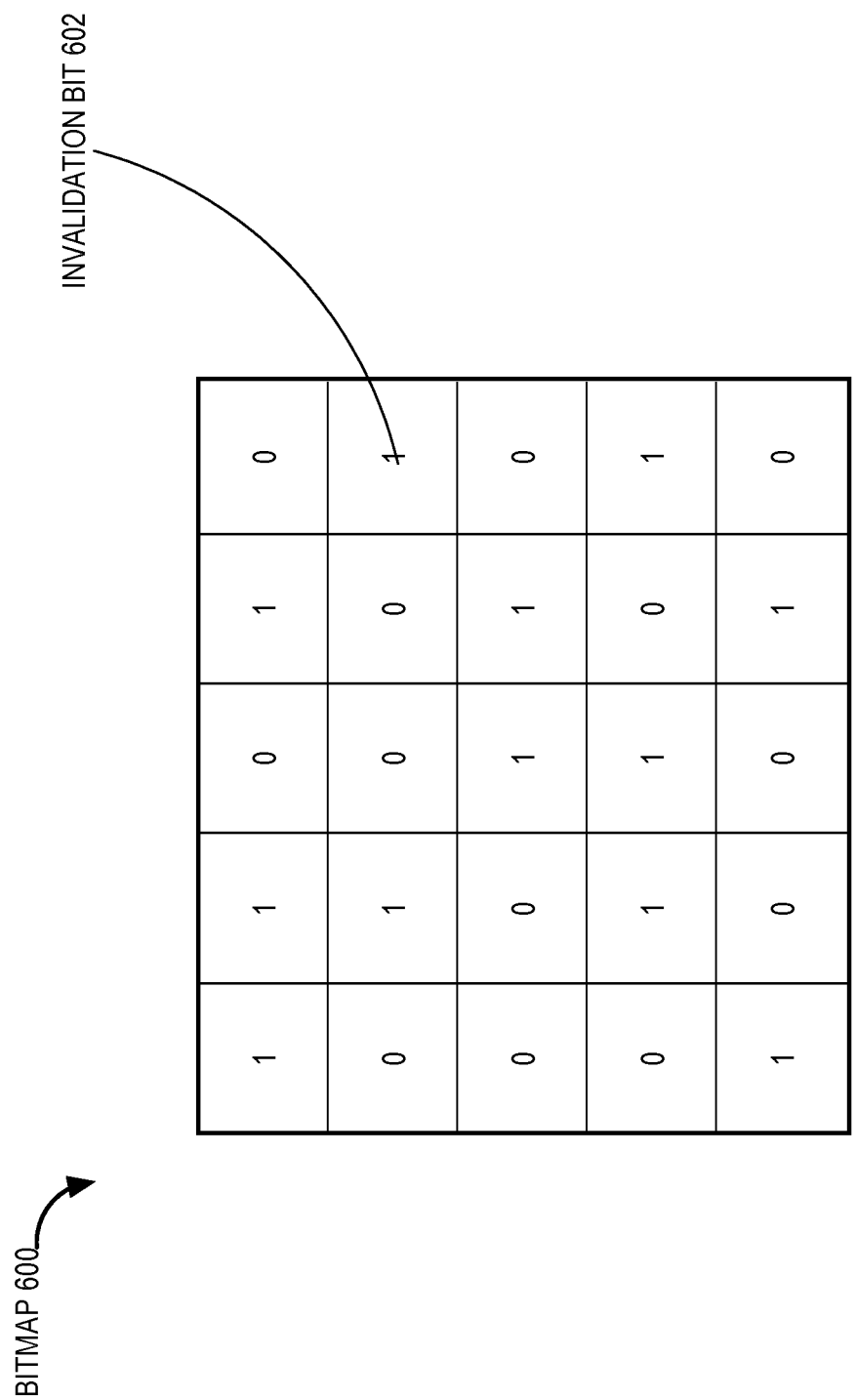
FIG. 6 depicts an example bitmap that corresponds to MF data.

Invalidating MF data may involve modifying metadata that describes the MF data. In some example embodiments, standby database system 204 may maintain such metadata as a bitmap. Referring to FIG. 6, bitmap 600 includes bits that each correspond to separate MF data stored in main memory. For example, invalidation bit 602 may correspond to MF data converted from PF data at relative data block address "110". Thus, invalidating MF data may involve flipping bits in bitmap 600. For example, "0" may indicate valid MF data, and "1" may indicate invalid MF data.

In some example embodiments, the reference timestamp is a consensus timestamp of parallel processes 210A-N. Thus, multiple transactions may have committed between old consensus timestamp 402 and new consensus timestamp 400. Consequently, standby database system 204 may perform MF data invalidation for multiple committed transactions in a batch.

If standby database system 204 is a clustered database system, a master instance broadcasts its MF data invalidations to other instances via an interconnect. For example, the MF data invalidations may be broadcast according to a publish-subscribe message pattern. Each of the other instances may apply the MF data invalidations to local bitmaps.

Upon invalidating MF data for one or more committed transactions, standby database system 204 frees memory corresponding to the one or more committed transactions. For example, standby database system 204 may free memory that was occupied by one or more transaction control structures and/or one or more portions of commit log 510.

In some example embodiments, standby database system 204 may run out of memory due to a long-running transaction that makes a large number of changes without committing. In other words, standby database system 204 may be unable to free memory that is used to record a growing number of uncommitted changes. As a result, standby database system 204 is unable to record any further changes in transaction log 500. Thus, until the long-running transaction commits, standby database system 204 iteratively performs the following: invalidates all MF data, flushes transaction log 500 to free memory, and reloads MF data in main memory when the reference timestamp advances.

In some example embodiments, standby database system 204 may encounter, for a particular transaction, an end transaction marker without a corresponding begin transaction marker. For example, standby database system 204 may see a begin transaction marker, lose power, restart, and see an end transaction marker. After restarting, all data in volatile memory may be lost. Thus, standby database system 204 may see an end transaction marker without a corresponding begin transaction marker. Since one or more changes may be missing from transaction log 500, standby database system 204 may be unable to reliably invalidate MF data. As a result, standby database system 204 invalidates all MF data, frees memory corresponding to any transactions that committed, and reloads MF data in main memory when the reference timestamp advances.

In some example embodiments, invalidation of MF data may be performed atomically with SCN advancement. Although transactions may commit between SCNs, invalidation of MF data may be synchronized with SCN advancement. Thus, MF data may be refreshed on a cycle that is untied to invalidation of the MF data. The relationship between invalidation of MF data and SCN advancement may result in time periods during which invalidation is effectively paused. For example, there may be a quiesce period during which SCN advancement does not occur.

Process Overview

Figure 7:
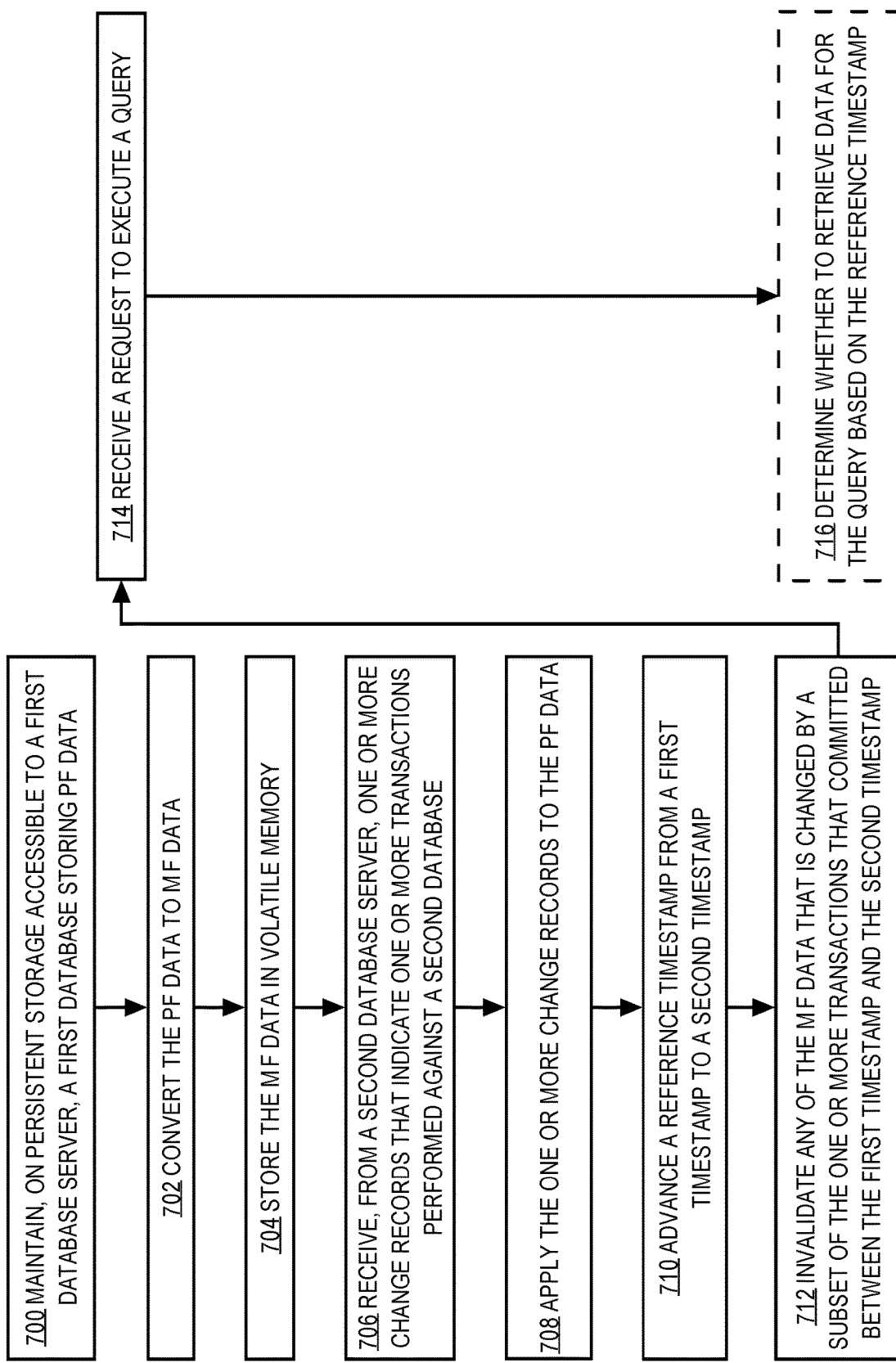
FIG. 7 is a flow diagram that depicts an approach for query execution against an in-memory standby database.

FIG. 7 is a flow diagram that depicts an approach for query execution against an in-memory standby database. At block 700, a standby database server maintains a standby database on persistent storage that is accessible to a standby database server. The standby database includes PF data that is stored on the persistent storage in a persistent format.

At block 702, the standby database server converts the PF data to a mirror format to produce MF data. The mirror format is different from and independent of the persistent format. In some example embodiments, block 702 is performed after block 714. Thus, the standby database server may convert PF data to MF data in response to receiving a query that can be executed against the MF data. In some example embodiments, block 702 is performed in response to receiving a command to pre-load particular MF data in main memory.

At block 704, the standby database server stores the MF data within volatile memory and/or any other portion of main memory. Block 704 may be performed concurrently with or subsequent to block 702.

At block 706, the standby database server receives one or more change records from a primary database server. The one or more change records indicate one or more transactions performed against a primary database. When the standby database server receives the one or more change records from multiple instances of the primary database server, the standby database server merges and/or sorts the one or more change records.

At block 708, the standby database server applies the one or more change records to the PF data. Applying the one or more change records may include committing a subset of the one or more transactions indicated by the one or more change records. In some example embodiments, parallel processes of the standby database server apply the one or more change records to the PF data. The one or more change records may be allocated among the parallel processes based on data block addresses of the PF data affected by the one or more change records.

For any of the one or more change records that affect MF data, the standby database server may store, in a transaction log, one or more operations for each transaction that changes any of the MF data. In some example embodiments, the standby database server allocates different memory address ranges of the transaction log to different parallel processes for storing the one or more operations.

At block 710, the standby database server advances a reference timestamp from a first timestamp to a second timestamp based on applying the one or more change records. In some example embodiments, the reference timestamp is a consensus timestamp of the parallel processes that applied the one or more change records.

At block 712, the standby database server invalidates any of the MF data that is changed by the subset of the one or more transactions that committed between the first timestamp and the second timestamp. In some example embodiments, invalidating changed MF data involves flipping, in a bitmap, one or more bits that correspond to the changed MF data. Additionally or alternatively, standby database server may determine which of the one or more transactions are committed transactions based on traversing a commit log. Block 712 may be performed prior to, concurrently with, and/or subsequent to block 710.

At block 714, the standby database server receives a request to execute a query. The request to execute the query may include a query time as of which the standby database server is to execute the query.

At optional block 716, the standby database server determines whether to retrieve data for the query based on the reference timestamp. If the reference timestamp is greater than or equal to the query time, the standby database server retrieves the data for the query. However, whether the data that is retrieved is MF data or PF data depends on whether the query can be serviced from MF data.

For example, MF data that is loaded into main memory at SCN 200 can service queries with query times that are at SCN 200 or higher. Any queries with query times that are below SCN 200 may be serviced from PF data in a cache or on disk. Subsequently, a reference timestamp may advance to 250, and some of the MF data may be invalidated. Thus, some queries with query times that are at SCN 200 or higher may be serviced from PF data if corresponding MF data has been invalidated. In some example embodiments, queries may be computed using a consistent read mechanism.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
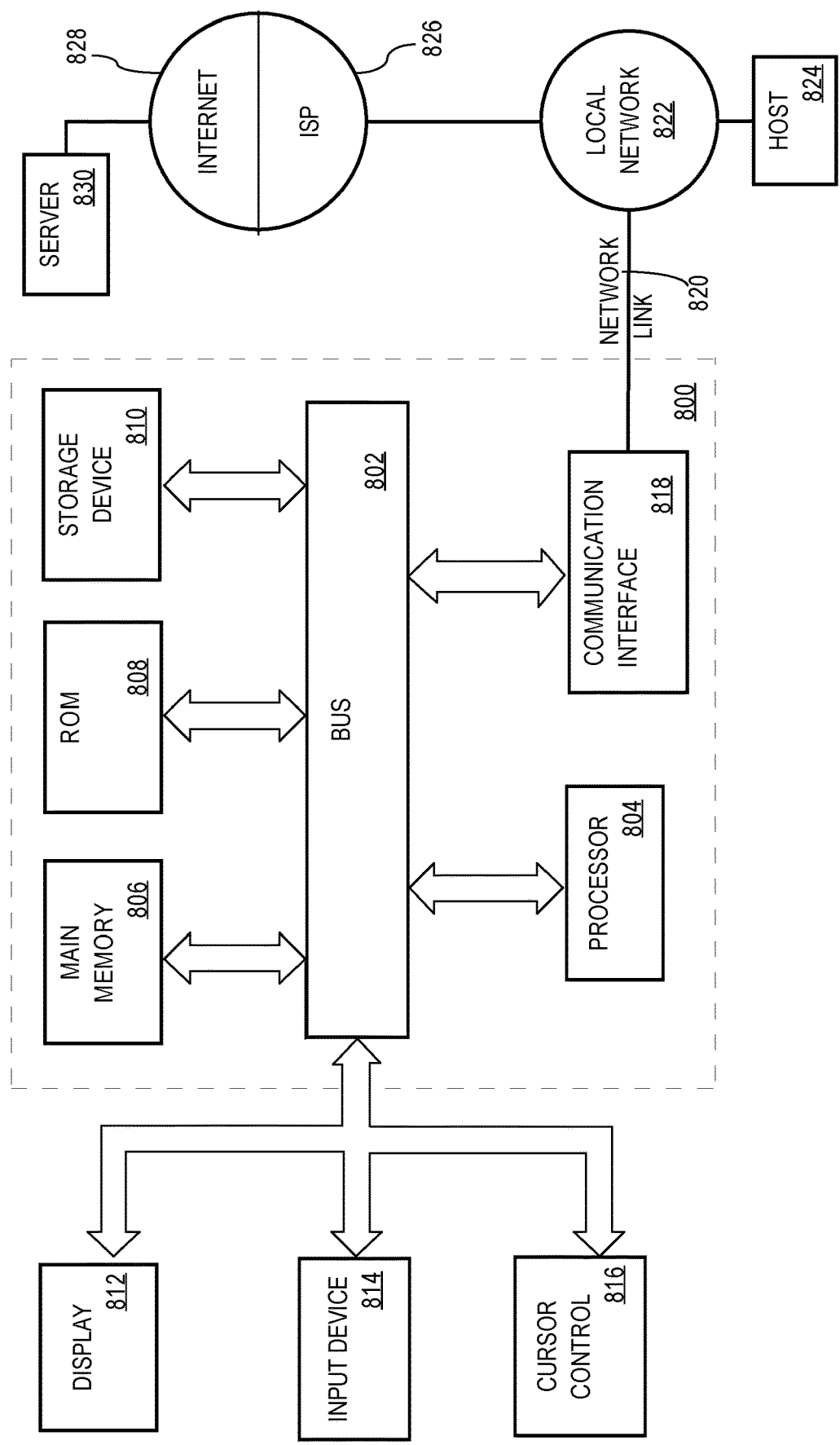
FIG. 8 depicts a computer system upon which an embodiment may be implemented.

For example, FIG. 8 is a block diagram that illustrates a computer system 800 upon which an embodiment of the disclosure may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:

maintaining, on persistent storage, a first database that is accessible to a first database server, wherein said first database is a standby for a second database that is accessible at a second database server;

wherein said first database includes a set of persistent format data (PF data), stored on said persistent storage, in a persistent format;

converting said set of PF data within said first database to a mirror format to produce a set of mirror format data (MF data) that is accessible to said first database server;

storing said set of MF data within volatile memory;

wherein said mirror format is different from and independent of said persistent format;

receiving, from the second database server by said first database server, a plurality of change records that specify changes to one or more data blocks in a second database, said changes to said one or more data blocks in said second database being made by a plurality of transactions performed against said second database;

applying, by said first database server, at least said plurality of change records that specify changes to said one or more data blocks in said second database to said set of PF data within said first database;

wherein applying, by said first database server, at least said plurality of change records includes committing a batch of transactions, said batch of transactions including said plurality of transactions;

after applying, by said first database server, at least said plurality of change records:
advancing a reference timestamp from a first timestamp to a second timestamp;
when advancing said reference timestamp, invalidating any of said set of MF data that is changed by said batch of transactions that committed between said first timestamp and said second timestamp;
comparing said reference timestamp to a query time as of which said first database server is to execute a query; and
when said reference timestamp is greater than or equal to said query time, delaying execution of said query; and wherein said method is performed by one or more computing devices.

2. The method of claim 1, wherein said applying, by said first database server, at least said plurality of change records that specify changes to said one or more data blocks in said second database is performed via parallel processes.

3. The method of claim 2, wherein said plurality of change records are allocated among said parallel processes based on data block addresses of PF data within said first database affected by said plurality of change records.

4. The method of claim 2, wherein said reference timestamp is a consensus timestamp of said parallel processes.

5. The method of claim 1, further comprising, prior to invalidating any of said set of MF data that is changed by any of said batch of transactions that committed between said first timestamp and said second timestamp, recording, in a transaction log, one or more operations for each transaction of any of said batch of transactions that changes any of said set of MF data.

6. The method of claim 5, wherein recording, in said transaction log, one or more operations for each transaction of any said batch of transactions that changes any of said set of MF data is performed via parallel processes that are each allocated a different memory address range of said transaction log.

7. The method of claim 1, wherein invalidating any of said set of MF data that is changed by any of said batch of transactions that committed between said first timestamp and said second timestamp comprises setting, in a bitmap, one or more bits that correspond to said any of said set of MF data.

8. The method of claim 1, wherein invalidating any of said set of MF data that is changed by any of said batch of transactions that committed between said first timestamp and said second timestamp comprises traversing a commit log that indicates which of said batch of transactions have committed.

9. The method of claim 1, wherein receiving, from the second database server by said first database server, said plurality of change records comprises merging said plurality of change records from multiple instances of said second database server.

10. One or more non-transitory storage media storing a set of instructions which, when processed by one or more computing devices, cause:
maintaining, on persistent storage, a first database that is accessible to a first database server, wherein said first database is a standby for a second database that is accessible at a second database server;
wherein said first database includes a set of persistent format data (PF data), stored on said persistent storage, in a persistent format;
converting said set of PF data within said first database to a mirror format to produce a set of mirror format data (MF data) that is accessible to said first database server;
storing said set of MF data within volatile memory;
wherein said mirror format is different from and independent of said persistent format;
receiving, from the second database server by said first database server, a plurality of change records that specify changes to one or more data blocks in a second database, said changes to said one or more data blocks in said second database being made by a plurality of transactions performed against said second database;
applying, by said first database server, at least said plurality of change records that specify changes to said one or more data blocks in said second database to said set of PF data within said first database;
wherein applying, by said first database server, at least said plurality of change records includes committing a batch of transactions, said batch of transactions including said plurality of transactions;
after applying, by said first database server, at least said plurality of change records:
advancing a reference timestamp from a first timestamp to a second timestamp;
when advancing said reference timestamp, invalidating any of said set of MF data that is changed by said batch of transactions that committed between said first timestamp and said second timestamp;
comparing said reference timestamp to a query time as of which said first database server is to execute a query; and
when said reference timestamp is greater than or equal to said query time, delaying execution of said query.

11. The one or more non-transitory storage media of claim 10, wherein said applying, by said first database server, at least said plurality of change records that specify changes to said one or more data blocks in said second database is performed via parallel processes.

12. The one or more non-transitory storage media of claim 11, wherein said plurality of change records are allocated among said parallel processes based on data block addresses of PF data within said first database affected by said plurality of change records.

13. The one or more non-transitory storage media of claim 11, wherein said reference timestamp is a consensus timestamp of said parallel processes.

14. The one or more non-transitory storage media of claim 10, wherein said set of instructions further comprises instructions, which when executed by said one or more computing devices, cause, prior to invalidating any of said set of MF data that is changed by any of said batch of transactions that committed between said first timestamp and said second timestamp, recording, in a transaction log, one or more operations for each transaction of any of said batch of transactions that changes any of said set of MF data.

15. The one or more non-transitory storage media of claim 14, wherein said set of instructions further comprises instructions, which when executed by said one or more computing devices, cause recording, in said transaction log, one or more operations for each transaction of any said batch of transactions that changes any of said set of MF data to be performed via parallel processes that are each allocated a different memory address range of said transaction log.

16. The one or more non-transitory storage media of claim 10, wherein invalidating any of said set of MF data that is changed by any of said batch of transactions that committed between said first timestamp and said second timestamp comprises setting, in a bitmap, one or more bits that correspond to said any of said set of MF data.

17. The one or more non-transitory storage media of claim 10, wherein invalidating any of said set of MF data that is changed by any of said batch of transactions that committed between said first timestamp and said second timestamp comprises traversing a commit log that indicates which of said batch of transactions have committed.

18. The one or more non-transitory storage media of claim 10, wherein receiving, from the second database server by said first database server, said plurality of change records comprises merging said plurality of change records from multiple instances of said second database server.

* * * * *